United States Patent [19]

Stephens

[11] Patent Number: 5,151,819
[45] Date of Patent: Sep. 29, 1992

[54] BARRIER FOR SCATTERING ELECTROMAGNETIC RADIATION

[75] Inventor: Richard B. Stephens, Del Mar, Calif.

[73] Assignee: General Atomics, San Diego, Calif.

[21] Appl. No.: 558,600

[22] Filed: Jul. 27, 1990

Related U.S. Application Data

[63] Continuation-in-part of Ser. No. 283,289, Dec. 12, 1988, abandoned.

[51] Int. Cl.⁵ .......................... G02B 5/02; B64G 1/54
[52] U.S. Cl. .................................. 359/350; 359/599; 244/158 R; 244/121; 250/515.1
[58] Field of Search .................. 350/1.1, 1.6, 1.7, 168, 350/311, 642; 250/515.1; 89/36.01, 36.02, 36.11; 244/158 R, 121; 359/350, 359, 360, 615, 884, 885, 599

[56] References Cited

U.S. PATENT DOCUMENTS

| | | | |
|---|---|---|---|
| 3,612,650 | 10/1971 | Miyano et al. | 350/126 |
| 3,671,286 | 6/1972 | Fischell | 350/1.7 X |
| 3,682,528 | 8/1972 | Apfel et al. | 350/1.7 |
| 3,722,977 | 3/1973 | Sloane | 350/1.1 |
| 3,967,582 | 7/1976 | Roberts et al. | 118/5 |
| 4,114,985 | 9/1978 | Friedman | 359/350 |
| 4,179,181 | 12/1979 | Chang | 350/1.7 |
| 4,214,818 | 7/1980 | Choyke et al. | 350/310 |
| 4,229,066 | 10/1980 | Rancourt et al. | 350/1.6 |
| 4,302,068 | 11/1981 | Tyroler | 350/1.1 |
| 4,383,728 | 5/1983 | Litington | 350/1.7 |
| 4,548,473 | 10/1985 | Lo et al. | 359/885 |
| 4,769,290 | 9/1988 | Hettich et al. | 350/1.6 X |
| 4,783,373 | 11/1988 | Baumeister et al. | 350/1.6 X |
| 4,847,506 | 7/1989 | Archer | 250/515.1 |
| 4,986,635 | 1/1991 | Spry | 359/886 |

FOREIGN PATENT DOCUMENTS

| | | | |
|---|---|---|---|
| 0089703 | 7/1981 | Japan | 350/1.6 |
| 0578634 | 10/1977 | U.S.S.R. | 350/1.7 |

OTHER PUBLICATIONS

*Advances in Ceramics*, vol. 21: *Ceramic Powder Science*, 1987, "Innovations in Ceramic Powder Preparation", D. W. Johnson, pp. 3-19.

*Advances in Ceramics*, vol. 21: *Ceramic Powder Science*, 1987, "Preparation of Yttria Powders by Emulsion Precipitation", M. Alinc & A. Celikkaya, pp. 57-98.

"Laboratories Test Material that Blocks Laser Energy", *Aviation Week & Space Technology*, Feb. 1, 1988, p. 75.

"Reflective Sol-Gel Coatings", E&TR, Jul. 1987, pp. 42-43.

(List continued on next page.)

Primary Examiner—Rodney B. Bovernick
Assistant Examiner—David R. Parsons
Attorney, Agent, or Firm—Fitch, Even, Tabin & Flannery

[57] ABSTRACT

A barrier supported by an object, such as a satellite or missile for use in space, for scattering a coherent beam of electromagnetic radiation having a wavelength in a predetermined range of wavelengths which range is within, but does not necessarily fully include, the range of about 0.2 micron to about 11 microns and emanating from a distant source of such radiation. The barrier includes a non-metallic layer formed by a large number of first components and large number of second components with each of the second components spacing adjacent ones of the first components. The first components have a relative high index refraction and the second components have a relatively low index of refraction. The optical thickness of at least a majority of the first and second components is within an order of magnitude of the wavelength of the radiation and both of the components are transparent at the wavelength of the radiation. The layer has a thickness between 0.2 micron and 1000 microns. A method of protecting the object is also disclosed.

15 Claims, 3 Drawing Sheets

OTHER PUBLICATIONS

*Journal of the Optical Society of America*, vol. 38, No. 9, Sep. 1948, "The Transmission of Powder Films in the Infra-Red", R. L. Henry.

"Scalar-Wave Localization in a Two-Component Composite", Sheng et al., *Physical Review Letters*, vol. 57, No. 15, Oct. 13, 1986, pp. 1879-1882.

"Transmission and Reflection of Laser Beams Propagating Through Aerosol Clouds in Space", A. Zardecki, Los Alamos Scientific Lab Report No. LA-9998-MS, Mar. 1984 database abstract.

"Inorganic Pigments: Bases for Colored, Uncolored, and Transparent Products", F. Hund, Angew. Chem. Int. Ed. Engl. 20, 723-730 (1981).

"Electromagnetic Absorption in a Disordered Medium near a Photon Mobility Edge", Sajeev John *Physical Review Letters*, vol. 53, No. 22, Nov. 26, 1984, pp. 2169-2172.

"Optical Transmission in Disordered Media", Azriel Z. Genack, *Physical Review Letters*, vol. 58, No. 20, May 18, 1987 pp. 2043-2046.

*Advances in Ceramics, vol. 21: Ceramic Powder Science*, 1987, "Effects of Physical, Chemical, and Kinetic Factors on Ceramic Sintering", M. F. Yan, pp. 635-680.

*Advances in Ceramics, vol. 21: Ceramic Powder Science*, 1987, "Influence of Hydroxide-Precursor Processing on the Densification of Yttrium Oxide Powders", F. Dogan, A. Roosen and H. Hausner, pp. 681-689.

1987, "Ceramic Powder Synthesis, by Thermal Reaction of Atomized Solutions", D. W. Sproson and G. L. Messing, pp. 99-108.

*Advances in Ceramics, vol. 21: Ceramic Powder Science*, 1987, "Production of File Powders by the Rapid Expansion of Supercritical Fluid Solutions", D. W. Matson, R. C. Petersen and R. D. Smith, pp. 109-120.

*Advances in Ceramics, vol. 21: Ceramic Powder Science*, 1987, "Pore Morphology Analysis Using Small-Angle Neutron Scattering Techniques", K. A. Hardman-Rhyne, pp. 767-778.

*Advances in Ceramics, vol. 21: Ceramic Powder Science*, 1987, "Pore Structure Analysis Via NMR, Mercury Porosimetry, and Dynamic Methods", D. M. Smith, T. E. Holt, D. P. Gallegos, D. L. Stermer, pp. 779-791.

BARRIER FOR SCATTERING ELECTROMAGNETIC RADIATION

This is continuation-in-part of U.S. application Ser. No. 283,289 filed Dec. 12, 1988, now abandoned.

This invention relates to apparatus for protecting an object against electromagnetic radiation and, more specifically, to a barrier for scattering a laser beam by causing the radiation to undergo multiple scattering events.

BACKGROUND OF THE INVENTION

It is known to apply a highly reflective metallic coating on a military object, such as a satellite or missile, in an attempt to protect that object from a laser beam emanating from a remote high power laser. Such a metallic coating functions by a combination of reflection and ablation. Of course, ablation reduces the reflectance of the coating and increases its absorption. Thus a metallic coating is not well suited to protect the object from multiple laser beam strikes or a single prolonged impingement.

A power laser mirror has been proposed including a substrate fabricated from high purity, small grain powders of refractory material. A highly reflective thin metallic film is adhered to the substrate, and a transparent dielectric film covers the metallic film to protect it from tarnishing. For further information concerning the structure and operation of this mirror, reference can be made to U.S. Pat. No. 4,214,818.

Equipment including an integrating sphere is used to measure the total luminous flux of a light source such as a lamp. The inside surface of the sphere has a diffusely reflecting white finish which integrates the light from the source. The interior finish can be a layer of small particles for achieving multiple scattering of the light. While individual particles are weak scatters, they combine to achieve diffuse-reflectances over 99% for a wide spectral range. Such finishes typically are over 1 mm thick and are limited to a spectral range of 300-2000 nm. Such finishes can be formed by MgO "smokes" or barium oxide paint.

SUMMARY OF THE INVENTION

Among the several aspects and features of the present invention may be noted the provision of an improved radiation barrier. If relatively thick, the barrier, which is transparent at the wavelength of the laser beam, can reflect over 99.9% of incident radiation. On the other hand if the barrier is relatively thin, it can be employed to defocus incident radiation. Furthermore, the barrier of the present invention is useful to protect an object from multiple laser beam strikes because the barrier has very low absorption. The barrier is rugged, has long service life, is lightweight and is relatively easy and economical to manufacture. Other aspects and features of the present invention will be, in part, apparent and, in part, pointed out specifically hereinafter in the accompanying specification and drawings.

Briefly, the present invention concerns the combination of an object to be protected from a coherent beam of electromagnetic radiation having a wavelength in the range of about 0.2 micron to about 11 microns and emanating from a distant source of such radiation, and a barrier for scattering the beam. The barrier includes a non-metallic layer formed by a large number of first components and a large number of second components with each second component spacing adjacent first components. The first components have a relatively high index of refraction and the second components have a relatively low index of refraction. The optical thickness of at least a majority of the first components and at least a majority of the second components are within an order of magnitude of the wavelength of the radiation, and the layer has a thickness in the range of 0.2 to 1000 microns. Both the first components and the second components are transparent at the wavelength of the electromagnetic radiation.

As a method of protecting an object from damage by a coherent beam of electromagnetic radiation, the method of the present invention includes the following steps:

a) A range of wavelengths of beams of electromagnetic radiation from which the object is to be protected is selected.

b) A first non-metallic component which is transparent in the range of wavelengths and which has a relatively high index of refraction is identified.

c) A second non-metallic component which is transparent in the range of wavelengths and which has a relatively low index of refraction is identified.

d) A barrier is made including a layer formed of a large number of the first components and a large number of the second components, with each of the second components being positioned between adjacent ones of the first components. The optical thickness of at least a majority of the first components and at least a majority of the second components is within an order of magnitude of a wavelength within the range of wavelengths selected. The layer has a thickness between about 0.2 micron and 1,000 microns.

e) The barrier is caused to be supported by the object so that the barrier is positioned between the object and the source of the radiation of concern.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
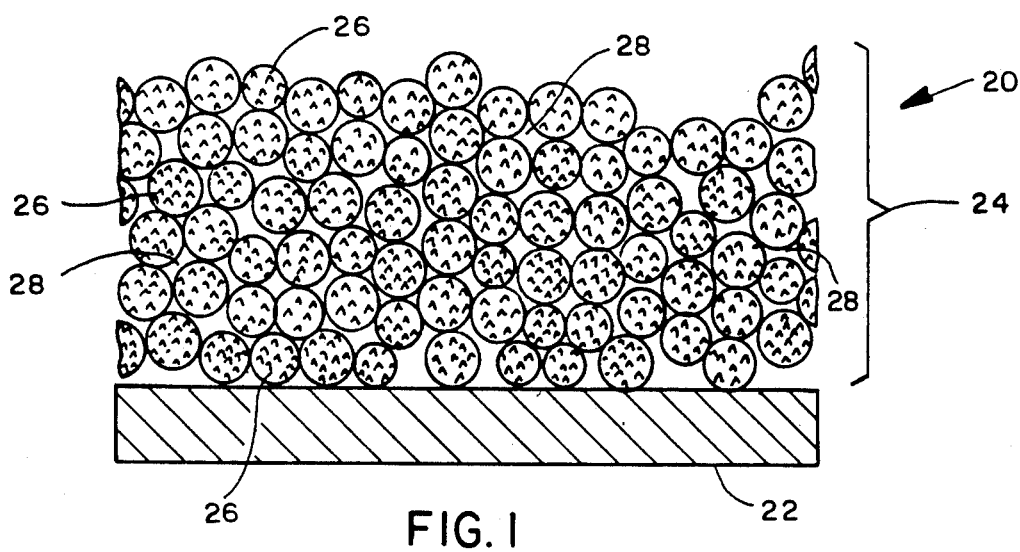
FIG. 1 is a cross-sectional view of an electromagnetic radiation barrier embodying various aspects of the present invention in which small grains of material are spaced by voids.

Referring now to the drawings, an electromagnetic radiation barrier for protecting an object 22 such as an orbiting satellite or a rocket booster, from a laser beam 23 emanating from a distant laser, is generally indicated in FIG. 1 by reference numeral 20. The barrier 20 includes a non-metallic layer 24 formed by a large number of first components, which may be grains 26, of material having a relatively high index of refraction. The layer 24 also includes a large number of second components, which can be voids 28, having a relatively low index of refraction.

Figure 2:
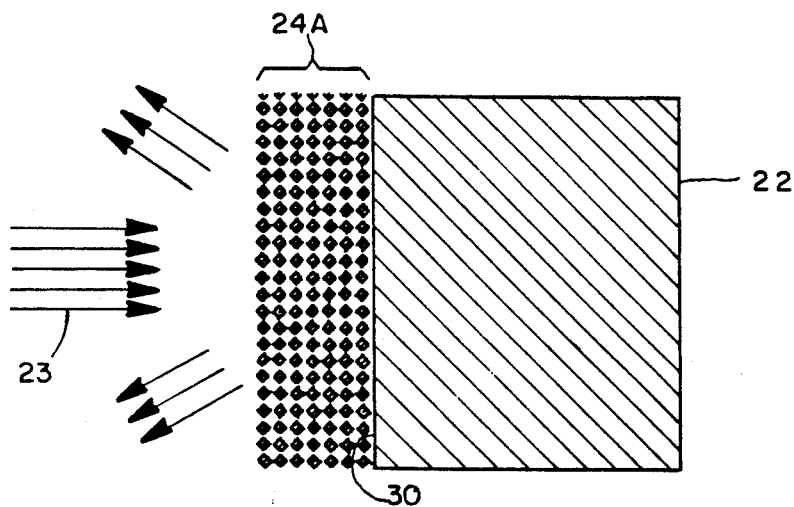
FIG. 2 is a simplified cross-sectional view illustrating a relatively thick barrier of the type shown in FIG. 1 positioned on the outside surface of the object to be protected and scattering a laser beam.
Figure 3:
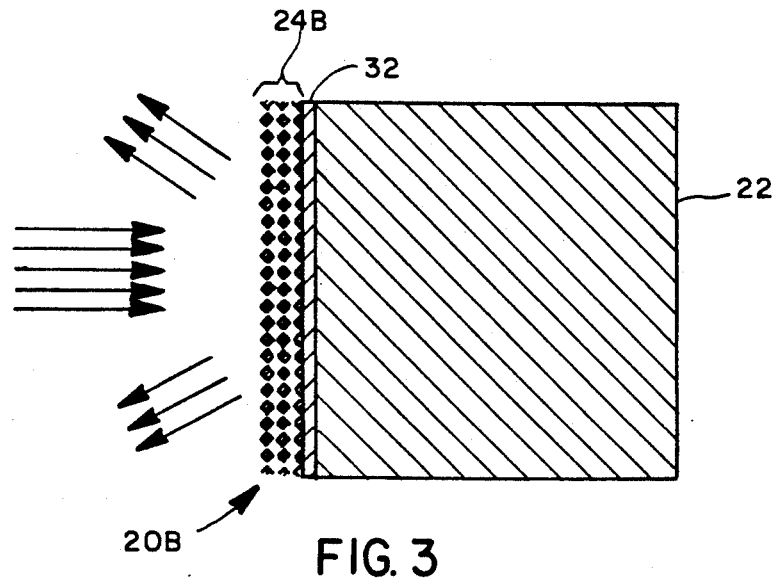
FIG. 3, similar to FIG. 2, illustrates a relatively thin barrier of the type shown in FIG. 1 with a metallic reflective layer disposed between it and the object to be protected.
Figure 4:
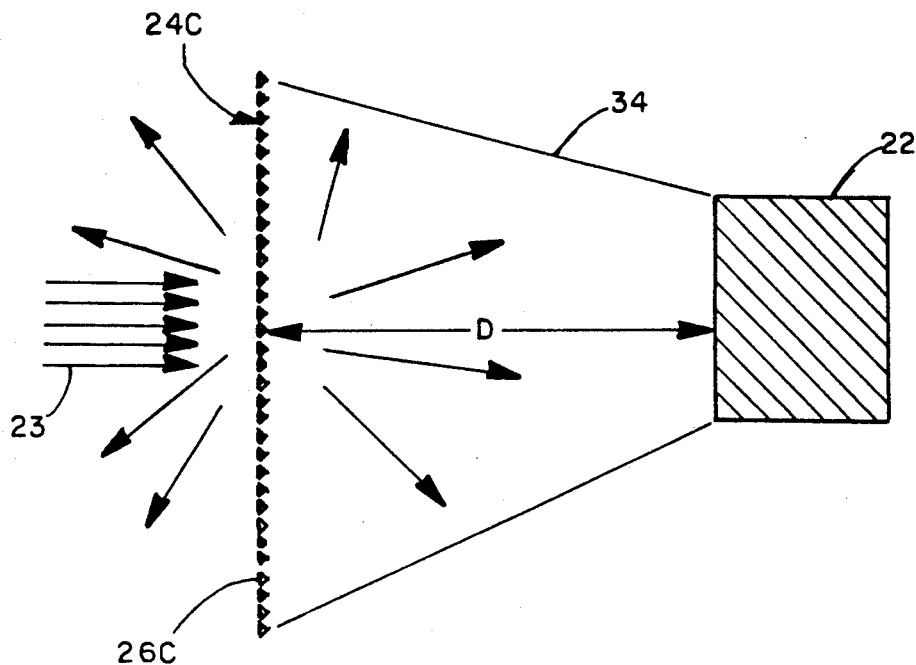
FIG. 4, also similar to FIG. 2, illustrates a very thin barrier of the type shown in FIG. 1 held at a distance from the object to be protected and decollimating the laser beam.

In the FIG. 1 cross-sectional view of the barrier, while the small grains of material 26 are shown spaced by another phase, in the form of the voids 28, it should be noted that in the three dimensional realization of this structure, both sets of phases or components are interconnected, and that the degree of randomness or order shown in the packing is only by way of example, and could be more or less regular. Because the voids are interconnected, the air occupying the voids can easily be replaced with a solid phase having the necessary characteristics, or with vacuum. It should further be noted that FIGS. 2-4 are simplified and that they are not intended to indicate that the first and second components are to be in regular arrays of rows and columns. The material is transparent at the wavelength of the electromagnetic radiation, and at least a majority of the grains and at least a majority of the voids have maximum cross-sectional measurements within an order of magnitude of the wavelength of the radiation. The selection of the grain size and void measurements near the wavelength maximizes the number of scattering surfaces. However, if the grain size and void diameter are significantly reduced below the wavelength, scattering is markedly reduced. The layer 24 has a thickness in the range of 0.2 to 1000 microns and, more preferably, has a thickness in the range of 1 to 100 microns.

The barrier must be designed for a specific wavelength range of the incident radiation. That wavelength range may be as much as an order of magnitude longer or shorter than the optimum protection wavelength, though that will be limited by absorption bands in the materials chosen. The arrangement of the first and second components may be substantially regular, or more random, depending on the shape and size distribution of the particles employed in a specific realization of this invention. The first components have a relatively high index of refraction and the second components have a relatively low index of refraction. The size of the optical components are within an order of magnitude of the wavelength of the radiation, and the layer has a thickness, depending on the use of the barrier, between a few particle diameters (realized as a diffuser) and $10^3$ or $10^4$ diameters (realized as a barrier). This construction provides effective protection for wavelengths up to an order of magnitude longer or shorter than the scale of the particles, limited only by the wavelengths at which the particles become absorbing.

Referring to FIG. 2, if the layer 24A has a thickness much greater than the light scattering length of the layer (the length needed for the electromagnetic radiation to become random due to multiple dielectric reflection), the form of the substrate carrying the layer is irrelevant. The layer 24A can be positioned directly on the outside surface 30 of the object 22. The object is fully protected from the radiation because substantially none of the radiation reaches the object. Because the size of the grains 26 shown in FIG. 1 are greater than the size of the voids or gaps 28 and because the grains have a higher index of refraction, making their optical thickness (actual thickness multiplied by their index of refraction) that much larger than the optical thickness of the voids, the size limitation for maximum scattering is established by the voids. The size of the voids should not be smaller than the wavelength of the radiation to be scattered.

However, as shown in FIG. 3, if the scattering length of the layer 24B is not appreciably thicker than the light scattering length, the barrier 20B preferably includes a highly reflective metallic substrate 32 disposed between the object 22 and the layer 24B. The presence of the layer 24B operates to reduce the intensity of the impinging radiation by several orders of magnitude. Thus the substrate 32 reflects the light but is not ablated by the incident power, in sharp contrast to known metallic radiation barriers.

As shown in FIG. 4, the scattering layer 24C could be very thin, for example, less than 10 microns, and supported a predetermined distance D from the object by a supporting structure 34. This distance D is preferably greater than the lesser of the major cross-sectional measurement of the beam 23 and the major dimension of the object 22. The thickness of the layer in this application is less than a few light scattering lengths of the layer. The scattering layer can have no substrate or a transparent thin one. The purpose of the layer is only to decollimate the incident beam, not to totally reflect it away from the object. The intensity of the decollimated beam which falls on the object is reduced proportionally to the square of the distance between the layer and the target.

The dielectric material of the grains 26 should be chosen to most effectively counter the estimated threats. The wavelengths of laser beams of general concern are in the range of about 0.2 to about 11 microns. Of particular concern are the Y-A-G laser having a wavelength of about 1 micron and the $CO_2$ laser having a wavelength of about 10.6 microns. Improvements in technology for UV lasers may result in their becoming significant threats. One advantage of the use of the scattering layer 24C, which is held at a distance from the object and which is deployed only after a threat becomes apparent, is that the enemy does not have an opportunity in advance to test the layer with a low power beam to determine at what wavelengths the material of the layer is transparent and at which wavelengths the material is absorbent.

The dielectric material of the grains 26 will be chosen with consideration of the range of potential threats. The material should be transparent over that range, be of high purity, have a high refraction index, have a high melting temperature and be highly reflective. A single material does not offer maximum values for all these criteria. The appropriate material must be selected in view of the particular threat to the object, among other considerations. Among materials considered particularly appropriate for the layer are LiF, $SiO_2$, $Al_2O_3$, MgO, diamond and $TiO_2$. The following table lists these materials, as well as other suitable materials, along with their respective index of refraction (n), melting temperature, and transparency range.

TABLE 1

MATERIAL PARAMETERS FOR POTENTIAL SCATTERERS

| Material | n | $T_m$(°C.) | transparent range (μm) | | |
|---|---|---|---|---|---|
| LiF | 1.4 | 845 | .12 | to | 8.5 |
| SiO$_2$ | 1.5 | 1700 | .16 | to | 4 |
| CaAl$_2$O$_4$ | | 1600 | .35 | to | 5.5 |
| Al$_2$O$_3$ | 1.8 | 2000 | .2 | to | 7 |
| MgO | 1.7 | 2800 | .3 | to | 9.5 |
| Diamond | 2.4 | 1700 | .22 | (weak absorber from 2-6 microns) | |
| TiO$_2$ | 2.7 | 1825 | .43 | to | 6.2 |
| LiNbO$_3$ | 2.3 | | .35 | to | 5.5 |
| MgF$_2$ | | 1266 | .45 | to | 9 |
| CaCO$_3$ | 1.7 | 1339 | .2 | to | 5.5 |
| SrTiO$_3$ | 2.5 | | .39 | to | 6.8 |
| Y$_2$O$_3$ | 1.9 | 2410 | .26 | to | 9.2 |
| CaF$_2$ | 1.4 | 1360 | .13 | to | 11.8 |
| As$_2$S$_3$ | 2.7 | 300 | .6 | to | 13 |
| ZnS | | 1850 | .6 | to | 14.5 |
| NaF | 1.3 | 988 | .14 | to | 15 |
| BaF$_2$ | | 1280 | .13 | to | 15 |
| Si | 3.5 | 1410 | 1.2 | to | 15 |
| ZnSe | 2.6 | >1100 | .48 | to | 22 |
| Ge | 4 | 937 | 1.8 | to | 23 |
| NaCl | 1.6 | 801 | .2 | to | 25 |
| NaI | | 651 | .25 | to | 25 |

These materials can diffusely reflect incident radiation at a very high efficiency. For example, the following table shows that TiO$_2$ powder has better reflectance than metals down to deep infrared. In this table the wavelength is expressed in nanometers.

TABLE 2

SPECTRAL REFLECTANCE OF METALS AND TiO$_2$ POWDER

| WAVE-LENGTH | ALUMINUM | SILVER | STAINLESS STEEL 304 | TITANIUM | VANADIUM | TiO$_2$ |
|---|---|---|---|---|---|---|
| 400 | 0.84 | 0.76 | 0.53 | 0.17 | 0.45 | 0.4 |
| 500 | 0.86 | 0.69 | 0.59 | 0.21 | 0.47 | 0.98 |
| 600 | 0.88 | 0.93 | 0.63 | 0.25 | 0.47 | 0.99 |
| 700 | 0.87 | 0.98 | 0.65 | 0.29 | 0.49 | 0.99 |
| 800 | 0.85 | 1.00 | 0.67 | 0.33 | 0.50 | 1.00 |
| 900 | 0.87 | 0.97 | 0.68 | 0.34 | 0.51 | 0.99 |
| 1000 | 0.93 | 0.96 | 0.70 | 0.34 | 0.52 | 1.00 |
| 1200 | 0.96 | 0.99 | 0.72 | 0.37 | 0.57 | 1.00 |
| 1400 | 0.97 | 1.00 | 0.80 | 0.40 | 0.65 | 1.00 |
| 1600 | 0.99 | 1.00 | 0.81 | 0.44 | 0.73 | 1.00 |
| 1800 | 0.97 | 1.00 | 0.80 | 0.45 | 0.72 | 1.00 |
| 2000 | 0.99 | 1.00 | 0.77 | 0.46 | 0.77 | 1.00 |
| 2400 | | | | | | 0.96 |

Taking TiO$_2$ as an example, it has a heat capacity, Cp=0.8 Joules/gram K, and a density of 4.3. A sintered powder has a relatively low mass density and is a poor conductor of heat so any energy absorbed would cause heating or vaporization of the surface of the layer upon which the laser beam impinges. About 60 J/cm$^2$ is required to heat a 0.1 mm thick layer to its melting point. Assuming that $10^{-3}$ of the incident power is absorbed, the layer so formed could withstand a pulse of $6 \times 10^4$ J/cm$^2$. Typical nonlinear absorption coefficients are approximately 100 cm$^{-1}$ for a beam having a power of a few MW/cm$^2$, which corresponds to an absorption of $10^{-3}$ for a photon path length of 1 mm. Thus the layer could withstand having the energy delivered in about 10 microseconds. While TiO$_2$ has a high refractive index, a high melting point and is readily available, its use is limited because it is effective only between about 0.4 and about 2.4 microns.

Materials are limited at the lower wavelength end of the range by electron excitations across the band gap, and at the upper wavelength end of the range by absorption from impurities and optical phonons. To improve the former, a material with a larger band gap should be selected. To improve performance at higher wavelengths, purer material and lower energy optical phonons are required. In either case, it is desirable to maximize melting temperature and refractive index, and minimize the impurity and phonon absorptions. Diamond powder (type IIA has the lowest absorption) appears from Table 1 to offer optimized performance.

The Kubelka-Munk formula relates the total scattering, $R_{tot}$, of a simultaneously scattering and absorbing material to the square of the ratio of the absorbing to the scattering strength (A and S respectively):

$$\frac{(1 - R_{tot})^2}{2R_{tot}} = \frac{A}{S}$$

This shows that any material can be very reflective as long as the scattering strength is much larger than the absorption strength. If S is $2 \times 10^4$A, for instance, $R_{tot} = 99\%$. That kind of ratio is achieved by addressing both sides of the fraction. A is minimized by using a very pure material (but this is limited by the non-linear absorption in high fields), and S is maximized by using particles of diameter near the wavelength of the incident beam and of very high refractive index.

Figure 5:
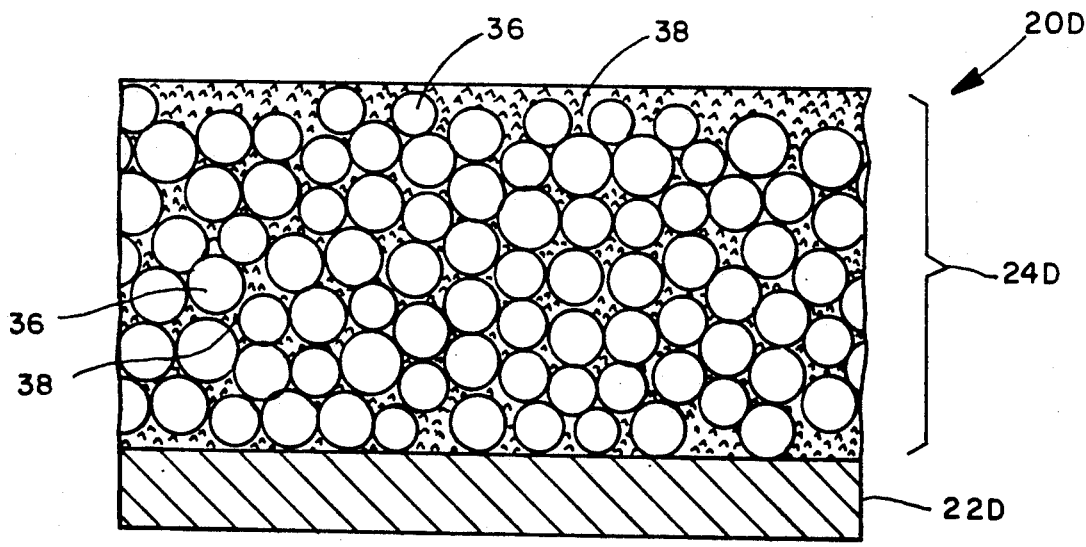
FIG. 5 is an alternative embodiment of the electromagnetic radiation barrier in which cell-like voids are defined by walls of material having a high index of refraction.

Referring to FIG. 5, an alternative embodiment 20D of the radiation barrier of the present invention is shown. In this embodiment the layer 24D has a closed cell configuration in which the second array of spaced components are the cells 36, which are voids, and the array of components are the walls 38 defining the cells and which are made of the material with the relatively high index of refraction. In certain respects the second embodiment is preferable to the embodiment of the barrier shown in FIG. 1. For maximum efficiency, the optical thickness (proportional to the index of refraction multiplied by the major dimension) for both the voids and the walls should be near the wavelength of the light to be scattered. In the second embodiment, the voids (which have the lower index of refraction) tend to have a larger major dimension then the walls (which have the higher index of refraction). Thus the conditions for maximum scattering are more easily achieved than in the first embodiment in which the gaps (voids) between the larger spherical grains of material determine the size of the structure.

The structures described in the various embodiments of this invention are straightforward to produce by one skilled in the art. High purity TiO$_2$ powder, for instance, is commercially sold in bulk quantity. Moreover, those of skill in the art know a large number of techniques for producing monodisperse spherical particles of the compounds of interest here. Reference may be made to the following articles published in *Advances in Ceramics, Vol. 21: Ceramic Powder Science,* 1987:

1. "Innovations in Ceramic Powder Preparation" by D. W. Johnson, Jr., pp. 3–19;
2. "Preparation of Yttria Powders by Emulsion Precipitation", by M. Akinc and A. Celikkaya, pp. 57–98;
3. "Ceramic Powder Synthesis by Thermal Reaction of Atomized Solutions" by D. W. Sproson and G. L. Messing, pp. 99–108;
4. "Production of Fine Powders by the Rapid Expansion of Supercritical Fluid Solutions" by D. W. Matson, R. C. Petersen and R. D. Smith, pp. 109–120;
5. "Effects of physical, Chemical, and Kinetic Factors on Ceramic Sintering" by M. F. Yan, pp. 635–680;
6. "Influence of Hydroxide-Precursor Processing on the Densification of Yttrium Oxide Powders" by F. Dogan, A. Roosen and H. Hausner, pp. 681–689;
7. "Pore Morphology Analysis Using Small-Angle Scattering Techniques" by K. A. Hardman-Rhyne, p. 767–778; and
8. "Pore Structure Analysis Via NMR, Mercury Porosimetry, and Dynamic Methods" by D. M. Smith, T. E. Holt, D. P. Gallegos and D. L. Stermer, pp. 779–791.

These particles can be sintered to form aggregates at any desired density. In the articles listed above, the object of the ceramists is to achieve very high density and very small pores. However, the articles indicate the ceramist has control over density and particle size as a function of annealing time and temperature. One may use other techniques than mentioned here, e.g., plasma spraying, to achieve the same structural result without departing from the spirit of this invention. Furthermore, one need not deposit both phases simultaneously as described in the references since there exist techniques for infiltrating one phase into the pores between another phase. The use of two solid phases rather than one solid phase and vacuum can have the desirable consequence of stabilizing the light scattering structure even at temperatures at which the particles soften and start to increase their size by reducing the interfacial tension which drives the coarsening. For yet another example, one can phase-separate a homogenous but metastable solid to produce two phases as described above. One of the phases can even be leached out if desirable. Vycor glass, produced by Corning Glass Co. is an example of this process.

Figure 6:
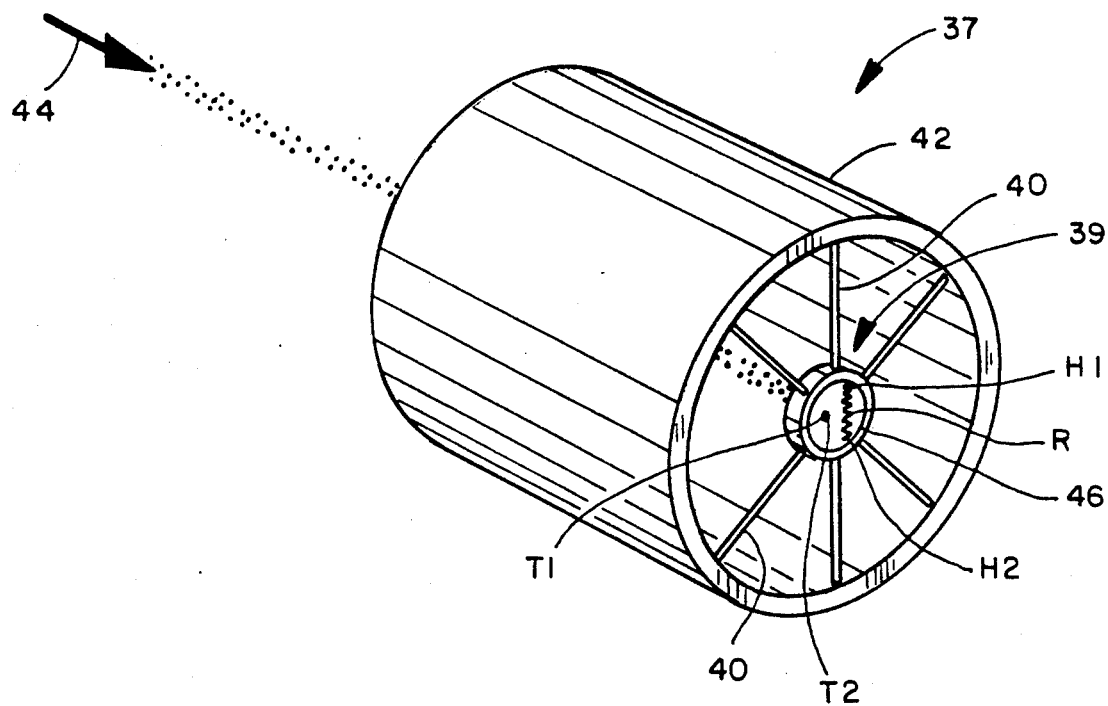
FIG. 6 is a perspective view of components of a laser calorimeter used to determine absorption of incident radiation by measuring temperature change.

Referring to FIG. 6, portions of a laser calorimeter 37 used to determine percent absorption of incident radiation by measuring temperature change, is shown. The laser calorimeter 37 includes a target assembly 39 supported by a number of radial spokes 40 supported by a cylindrical support wall 42 which is coaxial with the output of a laser 44. The laser 44 could be of the argon ion type providing electromagnetic radiation having a wavelength of about 0.5 microns and a power label in the range of one-third to one watt. The target assembly 39 includes a support disc 46 which may be formed of aluminum. Attached to the rear side of the support disk are thermocouple leads T1 and T2. A heater R which is preferably of the electrical resistance type is also attached to the disk 46 and includes leads H1 and H2. A target is supported on the front surface of the disc 46 and centered with respect to the laser beam. The target is sufficiently large that the entire laser beam impinges on the target.

The calorimeter 37 operates by first energizing the laser and then measuring the temperature rise of the target assembly by recording the voltage change across the leads T1 and T2 of the thermocouple. The laser is then deenergized and the assembly permitted to return to ambient temperature. Next the heater R is energized and the amount of power required for the heater to cause the target assembly to rise to the same temperature as resulting from impingement of the laser beam, is determined. The power required for this temperature rise is then divided by the incident power of the laser beam with the result being the percent of energy absorption of the target.

For calibration purposes, a target made of CuO (black powder) was used as the target. The calorimeter 37 measured that the percent of the energy absorption was 82%. Next aluminum foil was used as the target and the calorimeter indicated that it absorbed about 15% of the incident energy. The calorimeter 37 was also used to test the absorption of $Y_2O_3$, one of the candidate materials listed in Table 1. This $Y_2O_3$, while commercially available, is relatively pure and finely divided (less than two micron powder). The $Y_2O_3$ was pressed on the support disc 46 and was about 1 mil thick. The calorimeter test procedure described above indicated that the absorption for this $Y_2O_3$ powder was only about 1.2%.

As a method of protecting the object 22 from damage by a coherent beam of electromagnetic radiation by scattering the beam, the invention comprises several steps.

a) First the range of wavelengths of beams of electromagnetic radiation from which the object is to be protected is selected. For example, if the beam of concern emanates from a Y-A-G laser, the wavelength is about 1 micron.

b) A first non-metallic component which is transparent in the range of wavelengths and which has a relatively high index of refraction is identified. A suitable first component is $TiO_2$ which is transparent in the range of the 0.43 to 6.2 microns as indicated in Table 1 supra.

c) A second non-metallic component which is transparent in the range of wavelengths and which has a relatively low index of refraction is identified. This second component could be air or vacuum.

d) A barrier is formed including a layer formed of a large number of the first components and a large number of the second components, with each of the second components being disposed between adjacent ones of the first components. The optical thickness of at least the majority of the first components and at least a majority of the second components is within an order of magnitude of a wavelength within the range of the wavelengths. The layer has a thickness between about 0.2 micron and 1,000 microns.

e) The barrier is caused to be supported by the object so that it is disposed between the object and the source of the radiation of concern.

As a specific example of the formation of the barrier, the wavelength of concern is that of a laser beam emanating from a Y-A-G laser which beam has a wavelength of about 1 micron. The first compound is selected to be $Y_2O_3$ with the second component selected to be air. The powder should be prepared as described for sample A in "Influence of Hydroxide-Precursor processing on the densification of Yttrium Oxide Powders," by F. Dogan et al. on pp. 681–689 of *Advances in Ceramics, Vol. 21: Ceramic Powder Science*, 1987. That will produce 3 micron diameter powder, which when packed into a solid form and sintered, will have pores of about 1 micron, the optimum size for scattering the selected wavelength. The powder is pressed into a tile about 1 cm thick, and heated to a temperature of 1100° C. for 20 minutes. That will sinter the particles together and cause a linear shrinkage of 2% (a volume shrinkage of 6%): enough to hold the particles together strongly, but not enough to shrink the pores to an unacceptable extent. It is to be appreciated that different combinations of temperature and time will achieve the same ends, and that the thickness selected may be thicker or thinner depending on the desired insulating value. The resulting tile will have a diffuse reflectivity of about 99% and be quite high, at least about 90%, for the entire range between the band gap and the optical phonon frequency of $Y_2O_3$ (about 0.22 to 9 microns).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A barrier supported by an object, such as a satellite or missile for use in space, for scattering a coherent beam of electromagnetic radiation having a wavelength in a predetermined range of wavelengths, said predetermined range being within, but not necessarily fully including, the range of about 0.2 micron to about 11 microns and with said radiation emanating from a distant source of such radiation, said barrier comprising:

a non-metallic layer formed by a multiplicity of first components arranged in close proximity with each other and a multiplicity of second components, each of said components being disposed in the gaps formed between said first components, one of said components having a relatively low index of refraction such as for a vacuum or air and the other of said components having a substantially higher index of refraction, the optical thickness of at least a majority of said first components and at least a majority of said second components being within an order of magnitude of the wavelength of said radiation, both of said components being transparent at said wavelength, said layer having a thickness between about 0.2 micron and 1000 microns.

2. A barrier as set forth in claim 1 wherein said predetermined range is from about 0.5 micron to about 1.5 micron and wherein said first components are of a material selected from the group consisting of LiF, $SiO_2$, $CaAl_2O_4$, $Al_2O_3$, MgO, Diamond, $TiO_2$, $LiNbO_3$, $MgF_2$, $CaCO_3$, $SrTiO_3$, $Y_2O_3$, $CaF_2$, NaF, $BaF_2$, ZnSe, NaCl and NaI.

3. A barrier as set forth in claim 1 wherein said wavelength is about 1 micron.

4. A barrier as set forth in claim 1 wherein said predetermined range is from about 9 microns to about 11 microns and wherein said first components are of a material selected from the group consisting of $As_2S_3$, ZnS, NaF, $BaF_2$, Si, ZnSe, Ge, NaCl and NaI.

5. A barrier as set forth in claim 1 wherein said wavelength is about 10.6 micron.

6. A barrier as set forth in claim 1 wherein said second components are vacuum.

7. A barrier as set forth in claim 1 wherein said second components are interstices between said first components.

8. A barrier as set forth in claim 1 wherein said first components are grains of material.

9. In combination, an object to be protected from a coherent beam of electromagnetic radiation emanating from a laser distant with respect to said object, and a barrier for scattering said beam, said barrier comprising:

a non-metallic layer formed by a multiplicity of first components arranged in close proximity with each other and a multiplicity of second components, each of said second components being disposed in the gaps formed between said first components, said first components and said second components each having an index of refraction, one of said components having a relatively low index of refraction such as for a vacuum or air and the other of said components having a substantially higher index of refraction, the optical thickness of both a majority of said first components and a majority of said second components being within an order of magnitude of the wavelength of said radiation, said layer having a thickness in the range of about 0.2 to 1000 microns, both of said components being transparent at said wavelength.

10. In combination, an object such as a satellite or missile to be protected from a coherent beam of electromagnetic radiation emanating from a distant source of such radiation; a barrier for positioning between said source and said object; and a support means carried by said object for holding said barrier a predetermined distance from said object, said barrier comprising:

a non-metallic layer formed by a multiplicity of first components and a multiplicity of second components, each of said second components being disposed in the gaps formed between said first components, said first components and said second components each having an index of refraction, one of said components having a relatively low index of refraction such as for a vacuum or air and the other of said components having a substantially higher index of refraction, the optical thicknesses of a majority of said first components and of a majority of said second components being within an order of magnitude of the wavelength of said radiation, both of said components being transparent at said wavelength, said layer having sufficient thickness that the incident beam is decollimated and the intensity of radiation striking said object is reduced in proportion to the square of the distance between said barrier and said object.

11. The combination as set forth in claim 10 wherein the thickness of said layer is less than about a few light scattering lengths of said layer, said light scattering length being the length needed for the electromagnetic radiation to become random due to multiple dielectric reflection.

12. The combination as set forth in claim 10 wherein said first components are grains of material.

13. A barrier supported by an object, such as a satellite or missile for use in space, for scattering a coherent beam of electromagnetic radiation having a wavelength of about 1 micron and emanating from a distant source of such radiation, said barrier comprising:

a non-metallic layer formed by a multiplicity of first components and a multiplicity of second components, each of said second components being disposed in the gaps formed between said first components, said first components and said second components each having an index of refraction, one of said components having a relatively low index of refraction such as for a vacuum or air and the other of said components having a substantially higher index of refraction, the optical thickness of at least a majority of said first components and at least a majority of said second components being within an order of magnitude of the wavelength of said radiation, both of said components being transparent at said wavelength, said layer having a thickness between about 0.2 micron and 1000 microns, said first components being grains of material, said first components being of a material selected from the group consisting of LiF, $SiO_2$, $CaAl_2O_4$, $Al_2O_3$, MgO, Diamond, $TiO_2$, $LiNbO_3$, $MgF_2$, $CaCO_3$, $SrTiO_3$, $Y_2O_3$, $CaF_2$, NaF, $BaF_2$, ZnSe, NaCl and NaI.

14. A barrier supported by an object, such as a satellite or missile for use in space, for scattering a coherent beam of electromagnetic radiation having a wavelength of about 10.6 microns and emanating from a distant source of such radiation, said barrier comprising:

a non-metallic layer formed by a multiplicity of first components and a multiplicity of second components, each of said second components being disposed in the gaps formed between said first components, said first components and said second components each having an index of refraction, one of said components having a relatively low index of refraction such as for a vacuum or air and the other of said components having a substantially higher index of refraction, the optical thickness of at least a majority of said first components and at least a majority of said second components being within an order of magnitude of the wavelength of said radiation, both of said components being transparent at said wavelength, said layer having a thickness between about 0.2 micron and 1000 microns, said first components being grains of material, said first components being of a material selected from the group consisting of $As_2S_3$, ZnS, NaF, $BaF_2$, Si, ZnSe, Ge, NaCl and NaI.

15. A method of protecting an object, such as a satellite or missile for use in space, from damage by a coherent beam of electromagnetic radiation by scattering said beam, said method comprising the following steps:

(a) selecting a range of wavelengths of beams of electromagnetic radiation from which the object is to be protected;

(b) identifying a first non-metallic component which is transparent in the range of wavelengths and which has a substantially higher index of refraction than that for a vacuum or air;

(c) identifying a second non-metallic component which is transparent in said range of wavelengths and which has a relatively low index of refraction such as for a vacuum or air;

(d) forming a barrier including a layer formed of a multiplicity of said first components and a multiplicity of said second components, with each of said second components being disposed in the gaps formed between said first components, the optical thickness of at least a majority of said first components and at least a majority of said second components being within an order of magnitude of a wavelength within said range of wavelengths, said layer having a thickness between about 0.2 micron and 1,000 microns; and (e) causing said barrier to be supported by said object.

* * * * *

UNITED STATES PATENT AND TRADEMARK OFFICE
CERTIFICATE OF CORRECTION

PATENT NO. : 5,151,819
DATED : September 29, 1992
INVENTOR(S) : Stephens

It is certified that error appears in the above-identified patent and that said Letters Patent is hereby corrected as shown below:

ON THE TITLE PAGE:

Under [56] References Cited, Other Publications, p.2, the title "Advances in Ceramics, vol. 21: Ceramic Powder Science," should be removed from the last line of column 1 and inserted between lines 7 and 8 of column 2.

At column 7, line 16, change "physical" to --Physical--.
At column 9, line 41 (Claim 1) change "component s" to --second components--.
At column 10, line 56 (Claim 11) change "combination" to --combinations--.
At column 12, line 19 (Claim 15) change "the" to --said--.

Signed and Sealed this

Thirtieth Day of November, 1993

Attest:

BRUCE LEHMAN

Attesting Officer

Commissioner of Patents and Trademarks